United States Patent [19]

Tregay et al.

[11] 3,911,213

[45] Oct. 7, 1975

[54] FACSIMILE TRANSMITTING SYSTEM EMPLOYING REFERENCE PHOTO SENSOR

[75] Inventors: John L. Tregay, Weston, Conn.; Paul Z. Boros, New York, N.Y.

[73] Assignee: Comfax Communications, Inc., New York, N.Y.

[22] Filed: June 11, 1974

[21] Appl. No.: 478,330

[52] U.S. Cl. .......... 178/7.1; 178/DIG. 29

[51] Int. Cl.[2] .......... H04N 3/16

[58] Field of Search .......... 178/7.1, DIG. 29, DIG. 27, 178/DIG. 17, 6

[56] References Cited

UNITED STATES PATENTS

| | | | |
|---|---|---|---|
| 2,310,285 | 2/1943 | Hanson | 178/DIG. 29 |
| 3,379,826 | 4/1968 | Gray | 178/7.1 |

*Primary Examiner*—Richard Murray

*Attorney, Agent, or Firm*—Hopgood, Calimafde, Kalil, Blaustein & Lieberman

[57] ABSTRACT

In an information transmission system in which an information-carrying medium, such as a document or the like, is scanned by a spot or been produced by a light source, the light reflected from the medium is compared with light derived from the light source to develop an information signal that is a measure of the information content of the medium and is substantially unaffected by any variations in the intensity of the light source.

7 Claims, 2 Drawing Figures

FACSIMILE TRANSMITTING SYSTEM EMPLOYING REFERENCE PHOTO SENSOR

Figure 1:
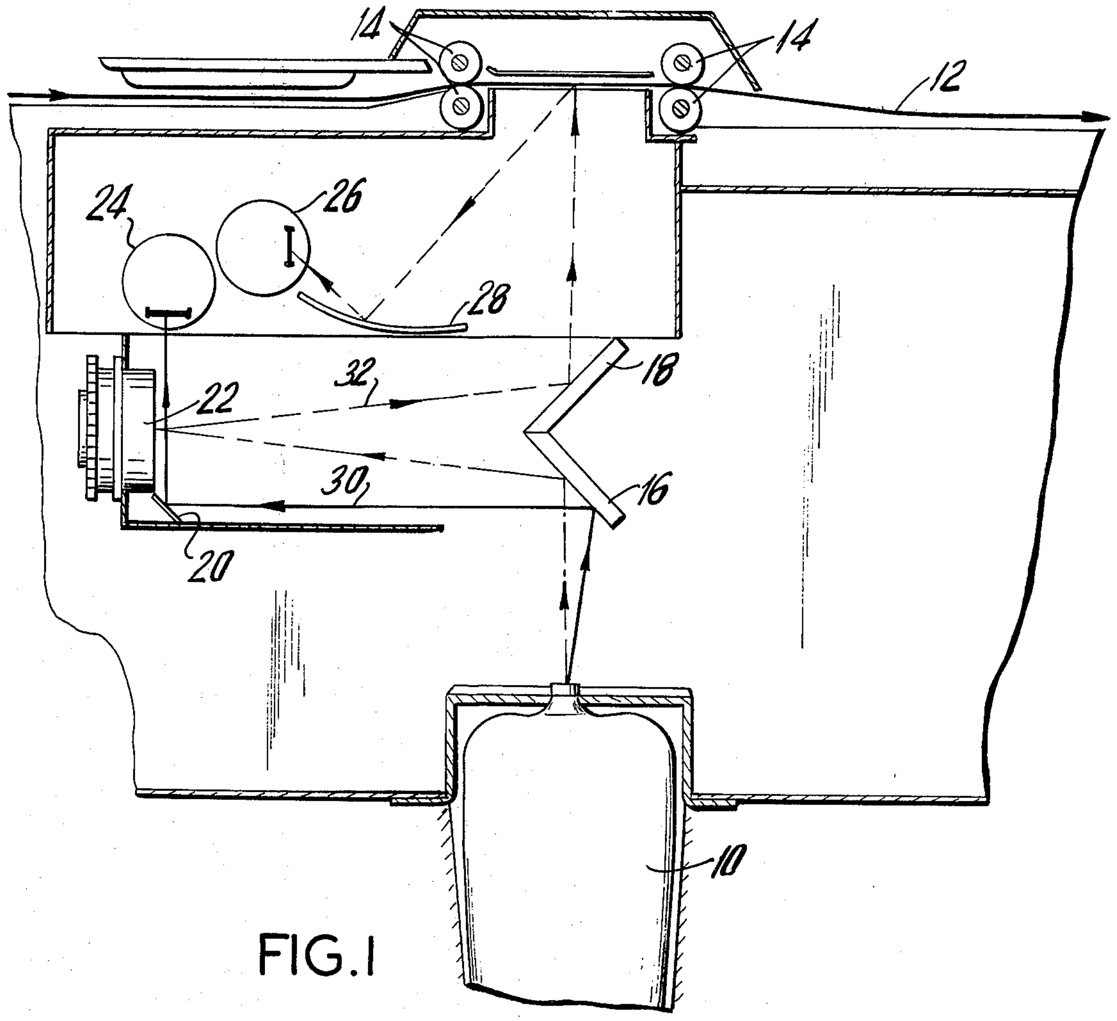

The present invention relates generally to information transmission, and more particularly to an information transmission system, such as a facsimile transmission system or the like, in which a source of light is scanned over an information-containing medium such as a document.

In a typical facsimile transmission system a light source, such as a flying spot produced by a cathode ray tube, is scanned over a document or other medium having information carried thereon. The information, which may be in the form of words or numbers, is usually printed on the document in black or other dark color on a white contrasting background. The reflection of the light from the dark information-carrying locations on the document is less than that reflected from the white background.

The reflection of the light beam from the document is sensed to produce an electrical signal that corresponds to the relative reflectance from the scanned regions of the document. That is, the signal bears a relation to the dark and light locations or optical density of the document. That signal, which is typically an analog signal, may, as is conventional, be converted to a corresponding binary signal by periodically sampling and comparing the analog signal to a threshold or reference signal, whereby signals at one binary level are produced when the analog signal exceeds the threshold signal and signals of the other binary level are produced when the amplitude of the analog signal is less than that of the threshold signal.

The difference in the amplitude of the light reflected from the information and background portions of the document may be relatively small, particularly from low-contrast documents where the difference in reflectance between information and background is low. Particularly under these circumstances the light that is incident on the document should be as constant as possible, so that any variation in the amplitude of the light reflected from the document, and the corresponding electrical signal produced, is related solely to the relative reflectance of the location of the document being scanned. If the intensity of the light is variable over the period of scanning, the light reflected from the document will also be a function of the intensity of the light source, and the data signal produced and transmitted to the data receiver may contain erroneous information.

In the conventional facsimile transmission system, the light being used to scan the document is a flying spot scanner in which a light spot is produced by a cathode-ray tube. The spot is deflected both vertically and horizontally in accordance with a standard scanning sequence so that the light produced by the tube is scanned over the document. The intensity of that light is often significantly variable for several reasons, including variations in the power supply voltage and current and non-uniformity in the phosphor coating on the cathode ray tube. In addition, the light intensity incident on the document varies as the spot is scanned from one end of a scan line to the other.

Attempts have been made by those working in the art of information transmission to produce a more constant light source by providing a more stable power supply for the cathode ray tube and by improving the uniformity of phosphor distribution on the face of the cathode ray tube. These proposed modifications to the existing facsimile transmission system, however, significantly increase the cost of the cathode ray tube and power supply to a level that effectively bars their use in commercial systems. Moreover, even if variations in the intensity of the scanning beam could be eliminated by improving the power supply and cathode ray tube in this manner, the variations in light intensity between the ends of the scanning line and the middle would still remain and introduce errors in transmission for the reasons discussed previously.

In a further attempt to improve the uniformity of light intensity of the scanning beam it has also proposed to arrange a complex arrangement of masks and mirrors to compensate for end-of-line scanning variations. This arrangement, in addition to its great cost and complexity offers no compensation for variations in light intensity produced by variations in the power supply and in the phosphor surface of the cathode ray tube.

As a result of the prohibitive expense needed to eliminate the variations in the intensity of the scanning light beam, commercial facsimile transmission systems usually operate with a variable intensity scanning beam, and thus have the undesired capability of transmitting incorrect data signals. The known facsimile transmission systems thus cannot be reliably used to transmit information, particularly when the information is carried on a low-contrast document.

It is thus an object of the present invention to provide a facsimile transmission system in which the signal transmission is unaffected by variations in the intensity of the scanning beam.

It is another object of the invention to provide a facsimile transmission system of the type described in which reliable and accurate signal transmissions can be achieved even from low-contrast documents.

It is a further object of the invention to provide a facsimile transmission system in which the signal transmitted is proportional virtually only to the document optical density.

In accordance with the invention, the light reflected from the scanned document is received by a signal sensor and stray light from the light source is simultaneously caused to be incident on a reference sensor. The signals produced by the two sensors are operatively combined to produce a data signal that is proportional only to the relative optical density of the portion of the document then being scanned and is completely unaffected by any variations in the intensity of the light source.

The invention is herein described as employed in a facsimile transmission system in which a cathode ray tube is employed as the light source. In the embodiment of the invention herein specifically described, the reference and reflected signals produced by the sensors are each amplified in a logarithmic amplifier, the outputs of which are respectively applied to the inputs of a differential amplifier. The output of the differential amplifier is the desired data signal that, as noted above, is independent of variations in the intensity of the light incident on the document as is desired for reliable facsimile transmission.

Figure 2:
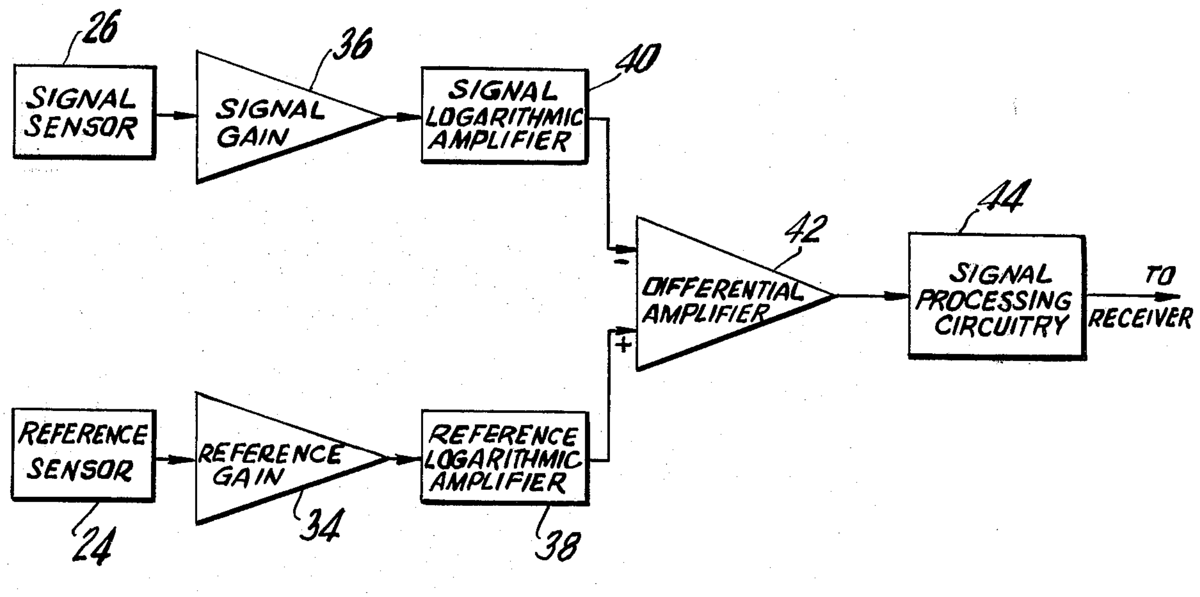

To the accomplishment of the above and to such further objects as may hereinafter appear, the present invention relates to an information transmitting system substantially as defined in the appended claims and as described in the following specification taken together with the accompanying drawing in which:

FIG. 1 is a schematic plan view of a portion of a facsimile transmission system illustrating the physical arrangement of components in accordance with one embodiment of the invention; and FIG. 2 is a schematic block diagram of the electrical portion of the embodiment of the invention of FIG. 1.

Although the present invention may be employed to advantage in a variety of information transmission systems, it is described herein with reference to a facsimile transmission system in which a beam of light produced by a cathode ray tube 10 is caused to scan over a document 12, which may contain information such as written, pictorial, or numerical data. The document typically has a white or highly reflective background on which the information is printed in a black or other dark medium which is less reflective than the white background. The light beam from tube 10 is caused to move over the document in accordance with scanning signals applied to the deflecting electrodes in tube 10 in a conventional manner. The document is moved in a direction transverse to the normal axis of tube 10 by means of rollers 14, also in a conventional manner.

It has been found that the intensity of the scanning light spot or beam incident or the document varies for the reasons stated earlier in this specification, and that these variations introduce errors in the information signals developed in the system. The present invention provides means for reliably achieving an information or data signal that bears a relation only to the information content or optical density of the document and is totally unaffected by any variations in the intensity of the scanning light beam.

To this effect, the intensity of light reflected from the document is compared in a manner to be described, with the instantaneous intensity of the light produced by the cathode ray tube. Referring to the embodiment of the invention illustrated in FIG. 1, mirrors 16 and 18 are arranged at an angle of 90° with respect to one another, mirror 16 being arranged at an angle of approximately 45° with respect to the normal axis of tube 10. A mirror 20 is located to receive light reflected from mirror 20, and thus from tube 10, and a signal sensor, here shown as a signal photomultiplier 26, is located to receive light that is reflected from the surface of document 12 by means of a curved mirror 28.

In the operation of the system of FIG. 1, a portion of the stray light from the cathode ray tube is reflected from mirrors 16 and 20, as indicated by the solid-line light path 30, and is received by reference sensor photomultiplier 24, the output of which is proportional to the instantaneous intensity of the light emitted from the cathode ray tube. The scanning light spot produced by the cathode ray tube is also reflected and focused by mirrors 16 and 18 and lens assembly 22 onto the surface of the document, as indicated by the broken-line light path 32, to the signal sensor photomultiplier 26. The light reflected from the document, which is proportional to the reflectance of the location of the document then being scanned, is reflected by mirror 28 and is received by signal sensor photomultiplier 26. The electrical signal produced by photomultiplier 26 is proportional to the instantaneous intensity of the light reflected from the document and thus to the product of the light output of the cathode ray tube and the reflectance of the location of the document than being scanned.

As shown in FIG. 2, the outputs of reference sensor 24 and signal sensor 26 are respectively applied to the inputs of a variable gain reference amplifier 34 and a variable gain signal amplifier 36. The outputs of amplifier 34 and 36 are in turn respectively applied to the inputs of signal and reference logarithmic amplifiers 38 and 40, the outputs of which are respectively applied to the positive and negative inputs of a differential amplifier 42. The output of amplifier 42, which is an analog electrical signal representing the information content of the document, is applied to a signal processing circuitry, generally designated as 44, in which the input analog signal may be sampled and converted in a known manner to a corresponding train of binary signals that are transmitted over any suitable communication linkage. to a distant data receiver at which the received data signal is processed to reproduce the information on the document. The design and manner of operation of processing circuitry 44 plays no part in the present invention and is well known to those in the art; it is, therefore, not further disclosed herein.

In the operation of the system, the output of reference photo sensor 24 may be adjusted to be equal to the output of signal photo sensor 26 when the scanning beam or spot is reflected from a high reflectance (practically 0 density) document surface. As the light output from the light source (here tube 10) is varied, the outputs of the reference and signal sensors change in proportion and, therefore, remain equal. The outputs from the reference and signal photo sensors maintain a 1:1 ratio so long as the reflectance of the portion of the document being scanned is close to 100% or 0 density. The output from signal photo sensor 26, however, is reduced when the scanning light spot is moved to a part of the document having less reflectance in proportion to the percent of reflectance, so that:

$$\frac{\text{Signal Sensor Output}}{\text{Reference Sensor Output}} = \text{Reflectance}$$

In the system illustrated schematically in FIG. 2, the outputs of the reference and signal sensors are amplified by logarithmic amplifiers 38 and 40 such that the output of differential amplifier 42 is proportional to the difference between the logarithm of the signal sensor output and the logarithm of the reference sensor output. Since $$\frac{\text{Signal Sensor Output}}{\text{Reference Sensor Output}} = \text{Reflectance}$$

as shown above, then the reciprocal is $$\frac{\text{Reference Sensor Output}}{\text{Signal Sensor Output}} = \frac{1}{\text{Reflectance}}$$

Therefore, the lagarithm of the reference sensor output minus the logarithm of the signal sensor output is equal to the logarithm of (1/Reflectance). The output of the differential amplifier is thus proportional to the logarithm of (1/Reflectance). For opaque materials, the reflective density is the logarithm of (1/Reflectance). The result is that the output signal of differential amplifier 42 is a direct measure of the document density at the spot being scanned and is substantially independent of instantaneous or slow changes in the light output from the light source over a wide range.

By adjusting the signal and reference sensor outputs, or the gains of the amplifiers 34 or 36, such that on a highly reflecting spot the ratio of $$\frac{\text{Signal Sensor Output}}{\text{Reference Sensor Output}}$$

is equal to a constant $K$, the output of differential amplifier 42 becomes proportional to $$\frac{1}{\text{Reflectance}} - K$$

so that the magnitude of the output of the differential amplifier may be shifted to any level that is convenient for use by the signal processing circuitry. If the range of the processing circuitry is adequate, the gain controls in the sensors or gain amplifiers may be eliminated.

From the foregoing it will be appreciated that in the system of the invention, the data or information signal derived by scanning a document with a light spot is independent of any variations in the intensity of the scanning spot so that reliable transmission of the information from the document can be achieved even from low-contrast documents, all without complex or costly additions to the system.

Although the invention has been herein specifically disclosed as employed in a facsimile transmission system, it may also be used to similar advantage in other applications utilizing a flying spot scanning technique such as video systems, character recognition equipment, and image analysis and processing systems.

In addition, although the facsimile transmitter of the invention is herein shown as transmitting data from an opaque document, wherein the data on the document is indicated by the reflectance of the scanning beam from the portion of the document being scanned, it may also be used to equal advantage in a facsimile system in which data from a transparent document such as microfilm microfiche, drawings on a transparent medium, or the like, is transmitted. In this type of system, the data content of the document is indicated by the relative intensity of light transmitted through the document. In such an arrangement, the image photo sensor is placed to the rear of the document to sense the amount of light from the scanning beam that passes through the document, rather than in front of the document to receive light reflected from the document, as shown in the embodiment of FIG. 1.

It will thus be understood that variations may be made in the described embodiment without necessarily departing from the true spirit and scope of the invention.

What is claimed is:

1. In a transmission system including a source of light and means for scanning the light produced by said source over a medium having an information content, said system comprising first and second light-responsive means, a first reflecting surface positioned intermediate said source and said medium for reflecting a first portion of said light to said first lightresponsive means without being first incident on said medium, said first light-responsive means being effective to produce a reference signal bearing a direct relationship to the intensity of the light from said source, means including said first reflecting surface and a second reflecting surface for directing a second portion of said light first onto said medium and then to said second light-responsive means, said second light-responsive means being effective to produce an image signal bearing a relationship to the intensity of light derived from said medium that corresponds to the information content of the portion of said medium on which light from said source is then incident, and means for operatively combining said reference signal and said image signal to develop a data signal that is indicative of the information content of the portion of said medium being scanned and is substantially independent of variations in the intensity of light produced by said source.

2. In the system of claim 1, in which said signal combining means comprises means for operatively subtracting said image signal from said reference signal.

3. In the system of claim 2, further comprising first amplifier means operatively connected between said reference signal producing means and a first input of said signal combining means, and second amplifier means operatively connected between said image signal producing means and a second input of said signal combining means.

4. In the system of claim 3, in which said first and second amplifier means each comprises a logarithmic amplifier.

5. In the system of claim 1, further comprising first amplifier means operatively connected between said first signal producing means and a first input of said signal combining means, and second amplifier means operatively connected between said second signal producing means and a second input of said signal combining means.

6. In the system of claim 5, in which said reference and second amplifier means each comprises a logarithmic amplifier.

7. In the system of claim 1, in which said second reflecting surface is arranged substantially at a right angle to said first reflecting surface, and further comprising further means for reflecting a portion of the light reflected from said first reflecting surface onto said second reflecting surface.

* * * * *